(12) United States Patent
Cheng et al.

(10) Patent No.: US 8,159,771 B2
(45) Date of Patent: Apr. 17, 2012

(54) CONTROLLING A HEAT RESISTIVE ELEMENT WITH A PULSE MODULATED SIGNAL

(75) Inventors: Chee Wee Cheng, Singapore (SG); Beng Theam Ko, Singapore (SG); Liu Li, Singapore (SG); Zhen Yu Sun, Singapore (SG); Myint Ngwe, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 1250 days.

(21) Appl. No.: 11/756,727

(22) Filed: Jun. 1, 2007

(65) Prior Publication Data
US 2008/0298197 A1 Dec. 4, 2008

(51) Int. Cl.
*G11B 5/147* (2006.01)
(52) U.S. Cl. ......... 360/75; 360/31; 360/46; 360/123.01; 369/100
(58) Field of Classification Search .................. None
See application file for complete search history.

(56) References Cited

U.S. PATENT DOCUMENTS

| | | | |
|---|---|---|---|
| 5,991,113 A | 11/1999 | Meyer et al. | |
| 6,411,072 B1 * | 6/2002 | Feldman | 323/299 |
| 7,061,706 B2 * | 6/2006 | Conteras et al. | 360/75 |
| 7,068,458 B2 | 6/2006 | Huang et al. | |
| 7,145,111 B2 | 12/2006 | Hori | |
| 7,158,325 B1 | 1/2007 | Hu et al. | |
| 7,170,714 B2 | 1/2007 | Coffey et al. | |
| 7,239,470 B2 * | 7/2007 | Takahashi et al. | 360/75 |
| 7,477,470 B2 * | 1/2009 | Leis et al. | 360/75 |
| 7,481,574 B2 * | 1/2009 | Ariyoshi | 374/11 |
| 2006/0268445 A1 * | 11/2006 | Brannon et al. | 360/75 |

FOREIGN PATENT DOCUMENTS

JP 2003-068424 * 3/2003

* cited by examiner

*Primary Examiner* — Muhammad N Edun
(74) *Attorney, Agent, or Firm* — Alan G. Rego; Westman, Champlin & Kelly, P.A.

(57) ABSTRACT

The disclosure is related to pulse width modulating a power signal to a heat resistive element of a transducer. The power signal may be a power output signal of preamplifier. The power signal may be provided to a heat resistive element in a transducer that is operable to read data from or write data to a data storage medium. The pulse width modulated power signal can allow for controlling the heating of the heat resistive element based on a thermal time constant of the heat resistive element and based on adjustable components of the pulse width modulated power signal.

22 Claims, 5 Drawing Sheets

CONTROLLING A HEAT RESISTIVE ELEMENT WITH A PULSE MODULATED SIGNAL

FIELD

The present disclosure relates generally to controlling a heat resistive element of a transducer.

BACKGROUND

Most disc drives use fly-height control to maintain a head to media separation at a controlled distance during data write operations. Preamplifier heater circuitry can assist fly-height control by delivering a programmable constant power to a resistive heater element on a slider to generate heat to effect protrusion in the slider element.

Currently, heater driver outputs from a preamplifier are from linear heater drivers as shown in FIG. 3. Such linear heater drivers deliver a continuous direct current (DC) constant Voltage/Power to a resistive heat element depending on a digital-to-analog conversion (DAC) setting in the preamplifier. The linear heat drivers suffer power loss and heat dissipation in the output stage. This can cause excessive power consumption for a device with a heater driver and is particular problematic for battery powered devices with a heater driver.

Therefore, there is a need for an improved device and method for controlling a heat resistive element of a transducer.

SUMMARY

The disclosure is related to pulse width modulating a power signal to a heat resistive element of a transducer.

In a particular embodiment, a method includes pulse width modulating a power output signal to provide a pulse width modulated signal. The method also includes providing the pulse width modulated signal to a heat resistive element in a transducer. The transducer is operable to read data from or write data to a data storage medium.

In another particular embodiment, a device is disclosed that includes a data storage medium, a transducer operable to read or write data to the data storage medium, and a heat resistive element. The device also includes a preamplifier coupled to the heat resistive element and the transducer. The preamplifier is configured to provide a pulse width modulated power signal to the heat resistive element.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present invention.

In a particular embodiment, a method includes pulse width modulating a power output signal to provide a pulse width modulated signal. The method also includes providing the pulse width modulated signal to a heat resistive element in a transducer. The transducer is operable to read data from or write data to a data storage medium.

In another particular embodiment, a device is disclosed that includes a data storage medium, a transducer operable to read or write data to the data storage medium, and a heat resistive element. The device also includes a preamplifier coupled to the heat resistive element and the transducer. The preamplifier is configured to provide a pulse width modulated power signal to the heat resistive element.

Figure 1:
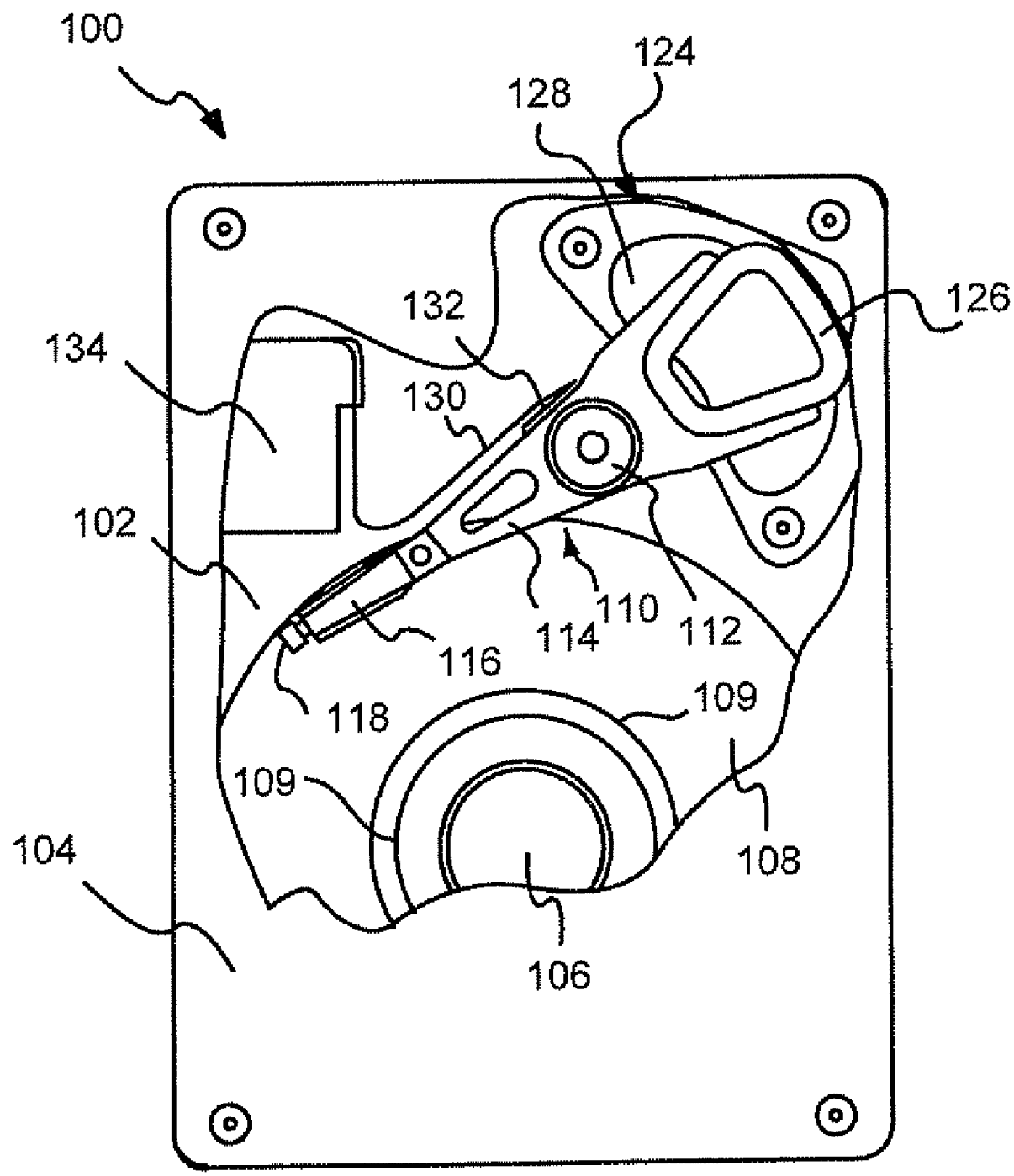
FIG. 1 is a cutaway view of an illustrative embodiment of a disc drive.

Referring to FIG. 1, in a particular embodiment, a disc drive 100 includes a base 102 to which various components of the disc drive 100 are mounted. A top cover 104, shown partially cut away, cooperates with the base 102 to form an internal, sealed environment for the disc drive. The components of the disc drive 100 include a spindle motor 106, which rotates one or more discs 108. Information is written to and read from tracks on the discs 108 through the use of an actuator assembly 110 that rotate about a bearing shaft assembly 112 positioned adjacent the discs 108. The actuator assembly 110 includes one or more actuator arms 114 that extend toward the discs 108, with one or more flexures 116 extending from the actuator arms 114. Mounted at the distal end of each of the flexures 116 is a head 118 including an air bearing slider (not shown) that enables the head 118 to fly in close proximity above the corresponding surface of the associated disc 108. The actuator arms 114 may be adjusted in order to adjust a distance between the heads 118 and the surface of the discs 108.

The track position of the heads 118 is controlled, during a seek operation, through the use of a voice coil motor (VCM) 124 that typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

A flex assembly 130 provides requisite electrical connection paths for the actuator assembly 110 while allowing pivotal movement of the actuator assembly 110 during operation. The flex assembly 130 can include a printed circuit board 132 to which head wires (not shown) are connected. The head wires may be routed along the actuator arms 114 and the flexures 116 to the heads 118. The printed circuit board 132 may include circuitry for controlling the write currents applied to the heads 118 during a write operation and a preamplifier (not shown) for amplifying read signals generated by the heads 118 during a read operation. The printed circuit board 132 may also include a preamplifier (not shown) having a heater driver to provide a power signal to a heat resistive element (not shown). The flex assembly 130 terminates at a flex bracket 134 for communication through the base 102 to a disc drive printed circuit board (not shown) mounted to the disc drive 100.

As shown in FIG. 1, a plurality of nominally circular, concentric tracks 109 can be located on the surface of the discs 108. Each track 109 includes a number of servo fields that are interspersed with user data fields along the track 109. The user data fields are used to store user data, and the servo fields are used to store servo information used by a disc drive servo system to control the position of the heads 118.

Figure 2:
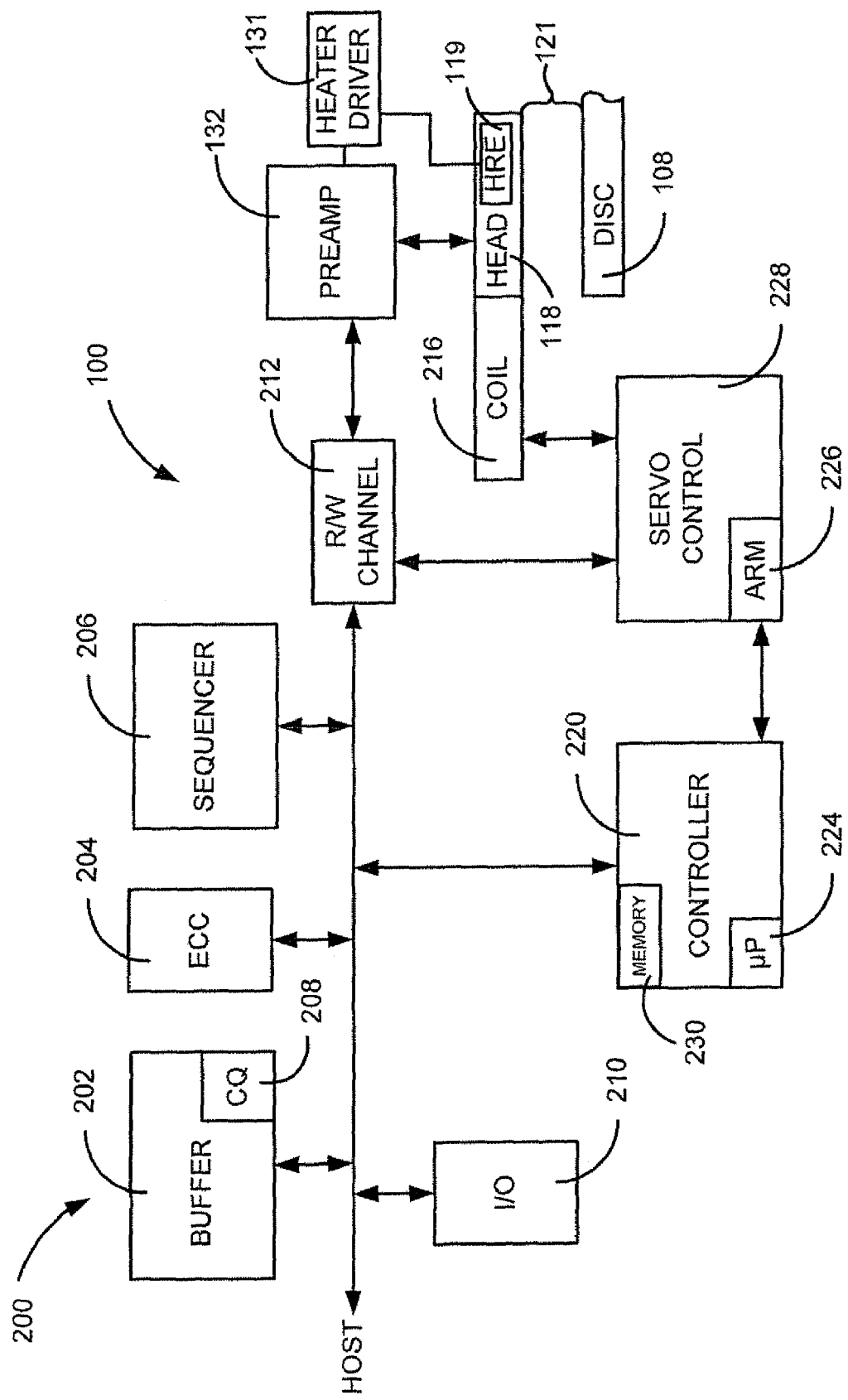
FIG. 2 is a block diagram of an illustrative embodiment of a disc drive system.

FIG. 2 provides a functional block diagram of the disc drive 100. A hardware/firmware based interface circuit 200 communicates with a host device (such as a personal computer, not shown) and directs overall disc drive operation. The interface circuit 200 includes a programmable controller 220 with associated microprocessor 224 and memory 230. In a particular embodiment, memory 230 is a first-in-first-out (FIFO) buffer. The interface circuit 200 also includes a buffer 202, an error correction code (ECC) block 204, a sequencer 206, and an input/output (I/O) control block 210.

The buffer 202 temporarily stores user data during read and write operations, and includes a command queue (CQ) 208 where multiple pending access operations are temporarily stored pending execution. The ECC block 204 applies on-the-fly error detection and correction to retrieved data. The sequencer 206 asserts read and write gates to direct the reading and writing of data. The I/O block 210 serves as an interface with the host device.

FIG. 2 further shows the disc drive 100 to include a read/write (R/W) channel 212 which encodes data during write operations and reconstructs user data retrieved from the discs 108 during read operations. A preamplifier/driver circuit (preamp) 132 applies write currents to the heads 118 and provides pre-amplification of readback signals. The heads 118 can include a heat resistive element 119 coupled to a heater driver 131.

In a particular embodiment, the heater driver 131 can be coupled to the preamplifier 132. In another particular embodiment, the heater driver 131 may be included in the preamplifier 132. In yet another particular embodiment, the heater driver 131 and the preamplifier 132 may be included in a single integrated circuit. In another particular embodiment, the heater driver 131 may include discrete components.

A fly-height 121 corresponding to a distance between the heads 118 and the discs 108 may be determined based on a feedback signal provided from the heads 118 to the preamplifier 132. The fly-height 121 may be adjusted based on the feedback signal.

A servo control circuit 228 uses servo data to provide the appropriate current to the coil 216 to position the heads 118. The controller 220 communicates with a processor 226 to move the heads 118 to the desired locations on the discs 108 during execution of the various pending commands in the command queue 208.

Figure 4:
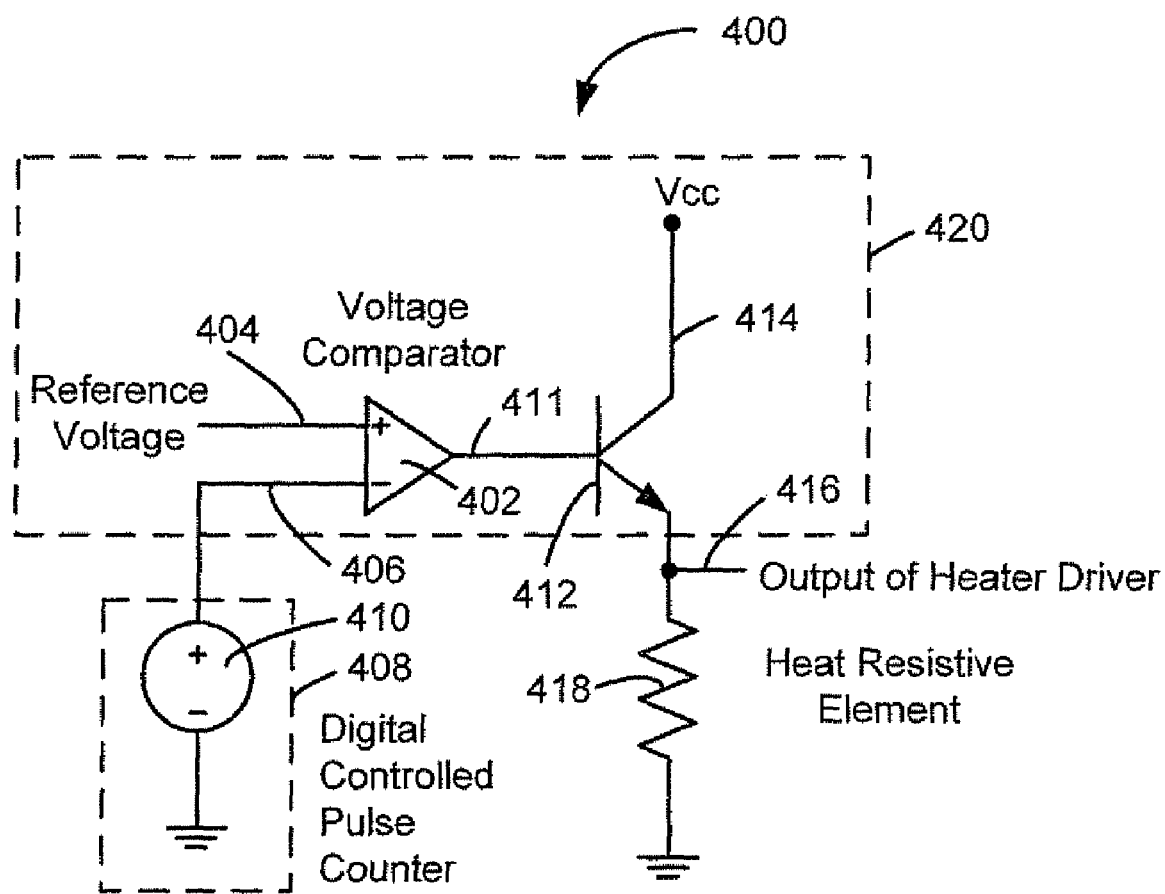
FIG. 4 is a circuit diagram of an illustrative embodiment of a device to provide power to a heat resistive element.

Referring to FIG. 4, a circuit diagram of an illustrative embodiment of a device to provide power to a heat resistive element is shown and generally designated 400. The device 400 can include a heater driver 420. The heater driver 420 may include a voltage comparator 402. The voltage comparator 402 may have a first input 404 to receive a reference voltage signal and a second input 406 to receive a signal from a digitally controlled pulse counter 408. In a particular embodiment, the digitally controlled pulse counter 408 includes a digital oscillator 410. The digital oscillator 410 may be controlled via a digital-to-analog conversion (DAC) setting of a preamplifier, such as the preamplifier 132 shown in FIG. 2. The digital oscillator 410 may provide a square wave digital voltage signal to the second input 406. The square wave digital voltage signal may have an adjustable duty cycle.

The voltage comparator 402 can also include an output 411 coupled to a base of a transistor 412. A collector of the transistor 412 may be coupled to a voltage source 414. An emitter of the transistor 412 may provide an output 416 to a heat resistive element 418, such as the heat resistive element 119 shown in FIG. 2.

Figure 3:
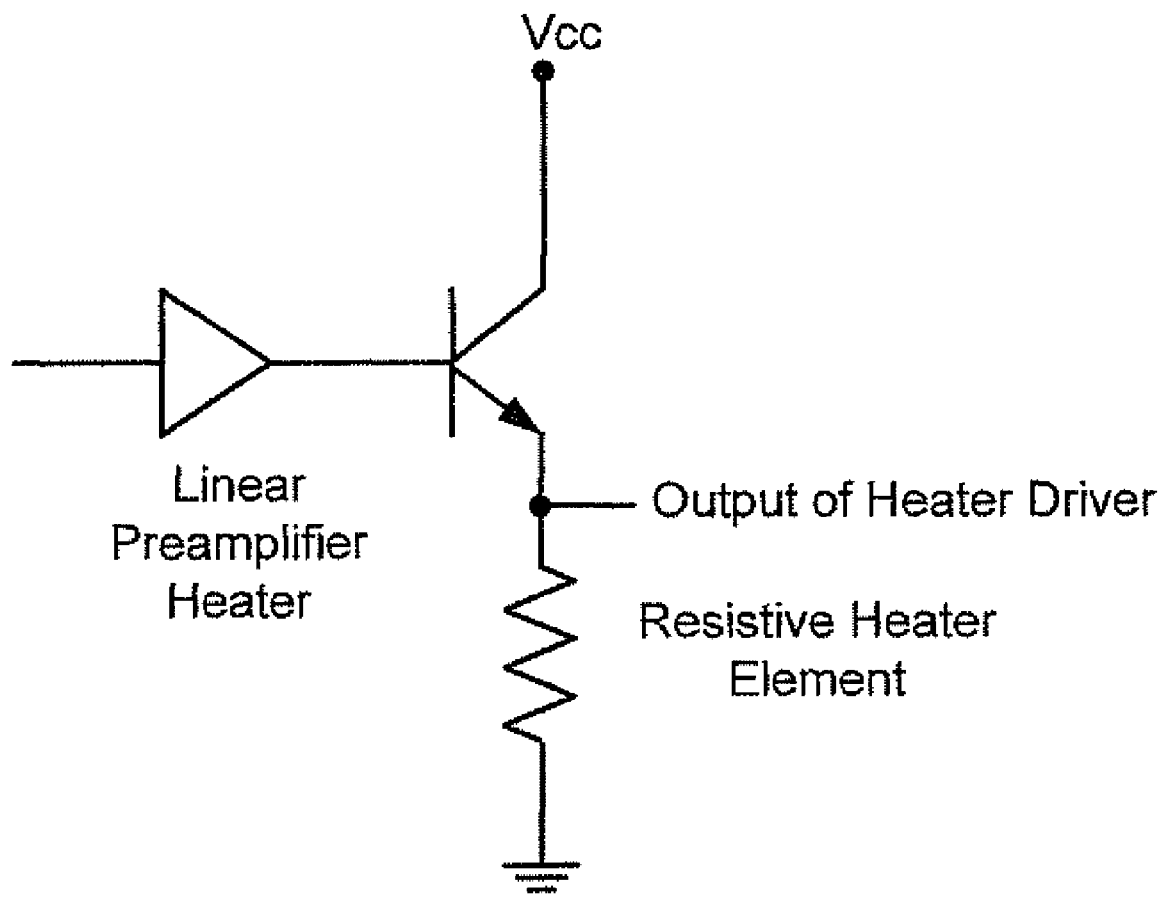
FIG. 3 is a circuit diagram of a prior art device to provide power to a heat resistive element.

The heater driver 420 may be included in an integrated circuit such as an integrated circuit preamplifier. The output 416 to the heat resistive element 418 may be provided via a power output pin of the integrated circuit. An integrated circuit preamplifier may have digital timer blocks that can deliver high frequency oscillations at the oscillator 410. Using the digital timer blocks can replace analog circuitry of a linear driver, such as the linear driver shown in FIG. 3, and, thus, the area of the integrated circuit may be reduced. In a particular embodiment, the heater driver 420 and the digitally controlled pulse counter 408 may be included in a single integrated circuit, such as the preamplifier 132 shown in FIG. 2.

During operation, the voltage comparator 402 receives a reference voltage signal at the first input 404 and a square wave digital voltage signal at the second input 406. The voltage comparator 402 then provides an output 411 to the transistor 412. As the square wave digital voltage signal goes high, the voltage comparator output 411 also goes high, enabling the transistor to provide a voltage to the heat resistive element 418. When the square wave digital voltage signal goes low, the voltage comparator output 411 also goes low, forcing the transistor to provide a lower voltage or no voltage to the heat resistive element 418.

In a particular embodiment, the amplitude and frequency of the heater driver output 416 are fixed, while the power cycle may be varied based on a digital-analog-conversion setting within the integrated circuit. Thus, the heat resistive element 418 can receive a continuous cycle of on and off voltages. The continuous cycle of on and off voltages will enable the heat resistive element to maintain an average heat. A heat resistive element having a thermal time constant that is much longer than a cycle of at least one on voltage and at least one off voltage would allow for the heat resistive element to provide an approximately continuous heat amount.

In addition, the heater driver 420 consumes less power since it is not on all the time compared to a linear beater output.

A pulse-width-modulated (PWM) output to the resistive heater element 418 may be accomplished by another implementation in a preamplifier.

Figure 5:
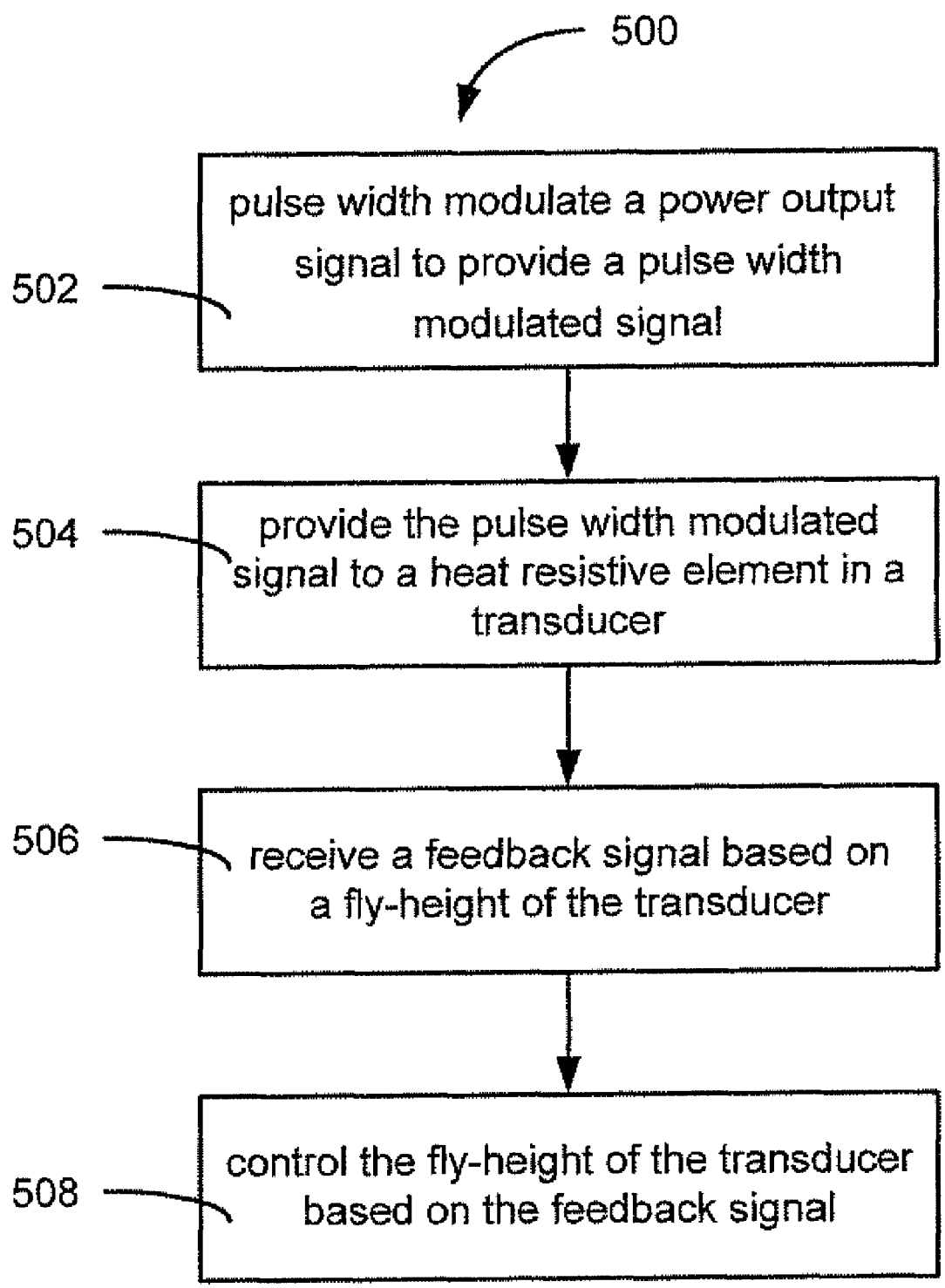
FIG. 5 is a flow diagram of an illustrative embodiment of a method to provide power to a heater driver.

Referring to FIG. 5, a flow diagram of an illustrative embodiment of a method to provide power to a heater driver is shown and generally designated 500. The method 500 can include pulse width modulating (PWM) a power output signal of a preamplifier, at 502. The method 500 can also include providing the power output signal to a heat resistive element in a transducer, at 504. The transducer can be operable to read or write data to a data storage medium, such as the heads 118 and the discs 108 shown in FIG. 1 and FIG. 2. In a particular embodiment, the method 500 may include pulse width modulating the power output signal continuously during operation of the transducer.

The pulse width modulated power output signal may be have a relatively fixed amplitude. Also, the pulse width modulated power output signal may have a relatively fixed frequency. Further, the pulse width modulated power output signal may have an adjustable rise time. In a particular embodiment, the rise time may be selected from one of multiple rise times. Even further, the pulse width modulated power output signal may have an adjustable fall time. In a particular embodiment, the fall time may be selected from one of multiple fall times.

In a particular embodiment, the method 500 may include receiving a feedback signal based on a fly-height of the transducer, where the fly-height can be based on a distance between the transducer and the data storage medium, at 506. The method 500 may also include controlling the fly-height of the transducer based on the feedback signal, at 508.

In yet another particular embodiment, the method 500 may include receiving a signal from a digital control, such as the digitally controlled pulse counter 408, to enable the pulse width modulating. The digital control may include an oscillator to output a square wave digit voltage signal. The power output signal may be determined by comparing the square wave digital voltage signal to a reference voltage signal.

Pulse width modulating the power output signal to be provided to a heat resistive element can reduce power loss by the heater driver itself, thus reducing power consumption overhead in the heating operation. This technique to reduce power may be particularly useful in consumer electronic applications, such as battery powered consumer electronics (e.g. cellular phone, portable computer, or portable music player). In addition, the reduced power consumption can be useful for laptop computers and desktop computers.

In accordance with various embodiments, the methods described herein may be implemented as one or more software programs running on a computer processor or controller, such as the controller 220. In accordance with another embodiment, the methods described herein may be implemented as one or more software programs running on a host device, such as a personal computer that is using a disc drive. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   pulse width modulating, by comparing a digitally controlled wave voltage signal with a reference voltage, a power output signal to provide a pulse width modulated signal; and
   providing the pulse width modulated signal to a heat resistive element in a transducer, the transducer operable to read data from or write data to a data storage medium.

2. The method of claim 1 wherein the power output signal further comprises a fixed amplitude.

3. The method of claim 1 wherein the power output signal further comprises a fixed frequency.

4. The method of claim 1 further comprising pulse width modulating the power output signal during operation of the transducer.

5. The method of claim 1 further comprising receiving the wave voltage signal from a digital control element.

6. The method of claim 5 wherein the digital control element comprises an oscillator to output the wave voltage signal.

7. The method of claim 1 wherein the power output signal has a rise time selected from one of multiple rise times.

8. A method comprising:
   pulse width modulating, by comparing a digitally controlled square wave voltage signal with a reference voltage, a power output signal to provide a pulse width modulated signal;
   providing the pulse width modulated signal to a heat resistive element in a transducer, the transducer operable to read data from or write data to a data storage medium;
   receiving a feedback signal based on a fly-height of the transducer, the fly-height based on a distance between the transducer and the data storage medium; and
   controlling the fly-height of the transducer based on the feedback signal.

9. A device comprising:
   a data storage medium;
   a transducer operable to read data from or write data to the data storage medium;
   a heat resistive element; and
   a heater driver coupled to the heat resistive element and the transducer, the heater driver configured to provide, by comparing a square wave digital voltage signal to a reference voltage signal, a pulse width modulated power signal to the heat resistive element.

10. The device of claim 9 wherein the heater driver further comprises:
   a digitally controlled pulse counter operable to output the square wave digital voltage signal; and a voltage comparator to determine the power output signal based on the reference voltage signal and the square wave digital voltage signal.

11. The device of claim 10 wherein the power output signal is pulse width modulated during operation of the transducer.

12. The device of claim 9 wherein the heater driver comprises a preamplifier.

13. The device of claim 9 wherein the power output signal further comprises a fixed amplitude.

14. The device of claim 9 wherein the power output signal further comprises a fixed frequency.

15. The device of claim 9 wherein a rise time of the power output signal is adjustable.

16. A device comprising:
a data storage medium;
a transducer operable to read data from or write data to the data storage medium;
a heat resistive element;
a heater driver coupled to the heat resistive element and the transducer, the heater driver configured to provide, by comparing a square wave digital voltage signal to a reference voltage signal, a pulse width modulated power signal to the heat resistive element; and
logic to receive a feedback signal based on a fly-height of the transducer, the fly-height based on a distance between the transducer and the data storage medium, wherein the logic is operable to control the fly-height of the transducer based on the feedback signal.

17. A heater driver comprising:
a voltage comparator, which determines a power output signal based on a reference voltage signal and a square wave digital voltage signal provided to an input of the voltage comparator; and
an output, which provides the power output signal to a heat resistive element in a transducer.

18. The heater driver of claim 17 further comprising:
a digitally controlled pulse counter operable to generate the square wave digital voltage wave signal.

19. The heater driver of claim 17 wherein the power output signal further comprises a fixed amplitude.

20. The heater driver of claim 17 wherein the power output signal further comprises a fixed frequency.

21. The heater driver of claim 17 wherein a rise time of the power output signal is adjustable.

22. The heater driver of claim 17 wherein the heater driver comprises a preamplifier integrated circuit.

* * * * *